SHIELD FOR TUBE SOCKETS
Filed May 27, 1949
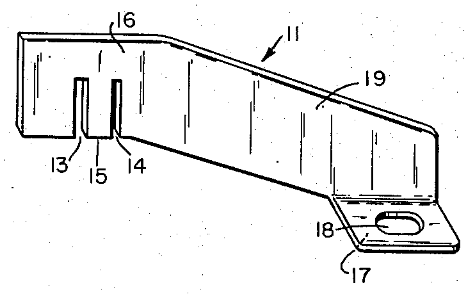
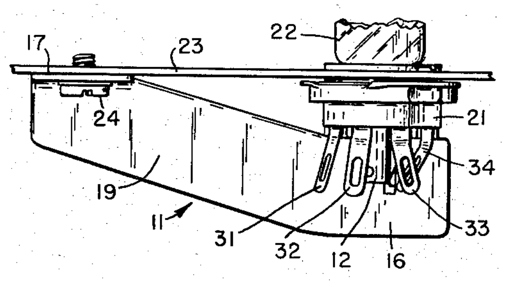
Fig. 1 Fig. 2
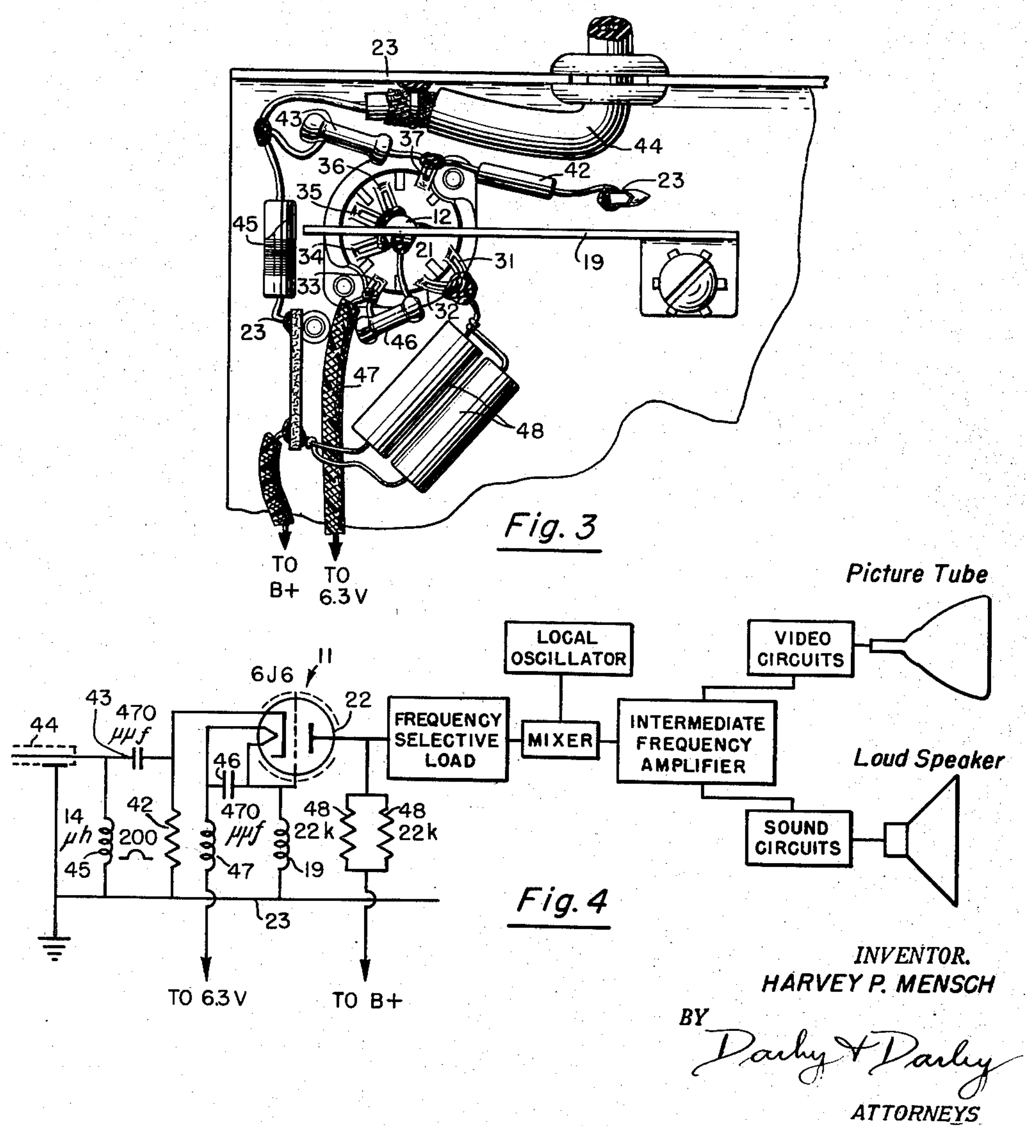
Fig. 3 Fig. 4
INVENTOR.
HARVEY P. MENSCH
BY Darby & Darby
ATTORNEYS Patented Nov. 13, 1951

2,574,978

UNITED STATES PATENT OFFICE 2,574,978

SHIELD FOR TUBE SOCKETS

Harvey P. Mensch, Orange, N. J., assignor to Allen B. Du Mont Laboratories, Inc., Passaic, N. J., a corporation of Delaware Application May 27, 1949, Serial No. 95,657

2 Claims. (Cl. 179—171)

This invention relates to radio circuits and particularly to a shield for thermionic tube sockets.

In ultra high frequency radio circuitry and particularly so-called cathode driven amplifiers, it has been found desirable to shield the input and output circuits from one another. For this purpose a conductive shield may be provided, this being connected to a chassis ground point close to the socket.

When such a device is used for the amplification of high frequency signals such as are used to convey television pictures, tubes having high mutual conductance are preferably used to obtain high stage amplification. These tubes require circuits carefully designed to prevent parasitic oscillations. One means for preventing these oscillations and stabilizing the amplifier is to include a small inductance between grid and ground so that the phase of signal feedback at these frequencies is degenerative. Such a device is described and claimed in a copending application No. 95,675, filed May 27, 1949, of Fred W. Schmidt. It is the object of my invention to provide a shield for a tube socket incorporating a value of inductance which, in accordance with the above named application, will stabilize a cathode driven amplifier and prevent parasitic oscillations.

It is a second object to provide a shield which may be produced simply and inexpensively.

It is another object to provide a shield having carefully controlled self inductance within narrow limits.

It is a further object to provide a shield which lends itself to the rapid and inexpensive assembly of television apparatus.

In the drawings:

Figure 1 is a perspective view of a shield representing one embodiment of the invention;

Figure 2 is a side elevational view of a chassis containing a tube socket and the shield of Figure 1, and showing in part the manner of connecting the shield to a tube socket;

Figure 3 is a bottom view of a portion of an amplifier containing the invention; and Figure 4 is a schematic diagram of the portion of the amplifier shown in Figure 3.

In Figure 1 there are shown the essential parts of one embodiment of the invention, comprising a strip 11 of conductive metal which is preferably tinned to receive solder. A pair of notches 13 and 14 cut into the lower edge of one end of the strip 11 form a tongue 15 having a width corresponding to the diameter of the tubular end of an internal shield 12, providing a convenient soldering surface. The strip 11 extending across a tube socket provides a shield between the input and output terminals of an amplifier tube mounted therein. At the other end of the strip 11 a grounding area 17 is formed by a laterally extending portion. A hole 18 is provided for a fastening means, such as a screw, to permit good electrical contact between the grounding area 17 and a chassis ground. That portion 19 of the strip 11 between the tube socket and the grounded end 17, bridging the space therebetween, has inductance which may be precisely controlled to a predetermined value by the physical dimensions thereof. The length and width of this bridge portion determine the inductance at the frequencies at which parasitic oscillations might occur, and may be determined by those skilled in the art according to well known princples. For instance, at present television frequencies, the portion of the strip may be 1½ inches long and ½ inch wide, providing a grid-to-ground inductance of .01 microhenries. The ground point or area 17 will be approximately 1½ inches from the center of the socket.

In Figure 2 the strip 11 is shown in place with a socket 21 of a type 6J6 amplifier tube 22 in a portion of a chassis 23. The grounding area 17 has been securely fastened to the chassis 23 by a self-tapping screw 24. At the other end of the strip, the tongue 15 fits into the tubular end of the internal shield 12, the notches 13 and 14 providing both clearance for the sides of the tubular shield 12 and a means for flowing solder to electrically join the strip 11 with the shield. Connecting pins 31, 32, and 33 are shown in place, but pin 34 has been bent over against the shield 12 to permit soldering thereto, these pins being those of a standard miniature socket. The other pins, not visible in this view, may be soldered to the internal shield if electrically desirable, as is pin 34 thus forming a direct path to the shielding strip 11, or they may be left open as are pins 31, 32, and 33 to permit connection to other elements.

Figures 3 and 4 illustrate the invention in operation. Pin 37 which connects to the cathode of the amplifier tube 22 through the socket 21 is connected to ground 23 through a resistor 42. Pin 37 is also connected through a capacitor 43 to the inner conductor of a coaxial antenna lead-in cable 44. The outer conductor of this cable 44 is connected directly to ground 23 and the inner conductor is connected through an inductance 45 to ground. The grids of the 6J6 amplifier tube 22 are connected to the shield by bending and soldering pins 35 and 36 to the internal shield 12. Pin 34 connected to one side of the heater is also soldered to the shield 12. The other side of the heater wire connected to pin 33 of the socket 22 is bypassed to the shield 12 through a capacitor 46, the self inductance of the heater lead 47 being sufficient to act as a choke.

Pins 31 and 32 of the socket, connected internally to the plates of the amplifier tube 22 are connected also to a positive source of direct voltage through the resistors 48 in parallel. A frequency selective load or utilization circuit is connected to the plates coupling the output of the amplifier tube 22 to other parts of a television receiver in a manner well known. The grids will be anti-resonant to ground at a frequency lower than a parasitic plate resonance.

Although a specific embodiment and structure has been shown and described, it will be obvious that the structure may be modified in accordance with the requirements of other applications without departing from the scope of the accompanying claims.

What is claimed is:

1. In a cathode driven amplifier containing a tube and a socket therefor having an input terminal connected to a cathode of said tube and an output circuit connected to a plate of said tube having a parasitic resonance, a conductive surface adjacent to said socket extending outwardly therefrom and connected to a grid of said tube, said surface lying between said input terminal and said output terminal, a metal chassis, and a conductive bridge forming a connection between said surface and said chassis, said bridge forming an inductance to cause said grid to be antiresonant at a frequency lower than said parasitic plate resonance.

2. In a cathode driven amplifier containing a chassis and a thermionic tube having a parasitic plate resonance, a shield between the input and output circuits of said amplifier, said shield being connected to form an inductance between a grid of said tube and ground, said grid being tuned by said inductance to parallel resonance at a frequency below that of said parasitic plate resonance.

HARVEY P. MENSCH.

REFERENCES CITED

The following references are of record in the file of this patent:

UNITED STATES PATENTS

| Number | Name | Date |
|---|---|---|
| 1,973,248 | Evans | Sept. 11, 1934 |
| 2,259,738 | Del Camp | Oct. 21, 1941 |

FOREIGN PATENTS

| Number | Country | Date |
|---|---|---|
| 523,440 | Great Britain | July 15, 1940 |